July 28, 1970   J. GRAVES ET AL   3,521,603

SUPPORT MEANS FOR POULTRY CAGES

Filed Feb. 28, 1968

INVENTORS
JEWEL GRAVES
HARVEY Z. BURKHOLDER
BY

ATTORNEYS

United States Patent Office 3,521,603
Patented July 28, 1970

---

3,521,603
SUPPORT MEANS FOR POULTRY CAGES
Jewel Graves, Holland, Mich., and Harvey Z. Burkholder, Ephrata, Pa., assignors, by mesne assignments, to U.S. Industries, Inc., New York, N.Y., a corporation of Delaware
Filed Feb. 28, 1968, Ser. No. 709,128
Int. Cl. A01k 31/00
U.S. Cl. 119—17                17 Claims

ABSTRACT OF THE DISCLOSURE

Apparatus for vertically supporting poultry confinement cages of the type having open-mesh floors, including upright standard elements which support a rod-like beam member disposed beneath the floor of each individual cage unit, with each such beam member extending completely across the underside of such cage, generally centrally thereof, but spaced beneath the cage floor except at a central point with respect thereto, where a cage floor-engagement part of the beam support extends upwardly and engages a single strand of the open-mesh floor, to support such floor at that point only, whereby the floor is adequately supported in a manner providing minimum restriction to and inhibition of the natural flexibility thereof.

BACKGROUND

The raising of poultry for egg-production purposes by maintaining the birds within confinement cages is rapidly becoming the predominating system in this country in recent times. This is true because this system affords many operating efficiencies, realized as a result of both the automated feeding of the birds and the automated egg-collection techniques to which this system is greatly conducive. Normally, the floors of the confinement cages are inclined somewhat so that eggs laid within the cages will, under the influence of gravity, slowly roll downwardly to the lowermost edge of the cage. Openings are provided along this edge so that the eggs may roll out of the cages and onto a conveyor belt located immediately outwardly of the cage, directly adjacent such openings. This conveyor takes the eggs to a central collection point, where they may be cleaned, graded, and packed, so that the eggs are thus collected from the cages automatically, with no manual effort involved.

The confinement cages are normally constructed of intermeshed wire-like metal rods which, while providing a cage which is adequately strong and sturdy, nonetheless provide for at least some inherent flexibility and resiliency in the generally flat sections forming the sides and the floor of the cages. However, the cages are normally supported in an elevated position such that they will be self-cleaning, droppings and the like falling directly through the mesh floors of the cages into a pit disposed therebeneath, in which automated scrapers or the like periodically operate to clean the pits.

The structures which support the cages vertically have generally in the past included a number of rods or other rigid beam-like members, on which the floor of the cage was directly rested. This tended to rigidify the cage construction, particularly the floor thereof, and in the past this has always been regarded as being a generally desirable attribute, since it gave the appearance of making the cage assembly stronger. In rigidifying the cage floors, however, previous constructions have inadvertently provided a source of extensive egg breakage. This has occurred when the eggs drop onto the rigid and unyielding floors at the time which they are laid and it also happens as the eggs roll over the inclined floor, toward the conveyor mechanism noted above. For a long time, this breakage was regarded as an inseparable adjunct of keeping poultry within confinement cages, and in many areas this thought persists even at the present time.

SUMMARY OF INVENTION

The present inventors have determined that the normal or inherent "give" or flexibility of the wire-mesh floor of most cages is sufficient to avoid a great deal of the egg breakage heretofore experienced if such inherent resilience or flexibility is not restrained, as for example by direct contact with the typical rigid beam-like supportive members which extend beneath and support the floor of most conventional next or cage equipment.

Accordingly, the present invention provides a support structure adapted to securely support poultry confinement cages in an elevated position above the floor of a poultry house or the like, while at the same time leaving most of the floor portion of the confinement cages substantially free of contact with rigid supporting elements located therebeneath, so that the inherent flexibility or yieldability of the poultry-supporting cage floor is restrained or inhibited only at a single point, and is unrestrained and uninhibited over all other poultry supporting portions of such floor.

In essence, the most preferred embodiment of the present support apparatus comprises a series of support stands or standards, each having support portions which engage the bottom of the cages at their edges only, together with beam-like support members which extend across the underside of the cage floor and are spaced beneath the same except at one centrally-located point. At this point these beam-like members have an upwardly-raised portion which contacts a single strand of the metal mesh which the floor is formed of, to thereby support the floor only at or near its center while leaving all other poultry-supporting parts of the floor generally unrestrained, with generally uninhibited yieldability.

DRAWINGS

PREFERRED EMBODIMENT

Figure 1:
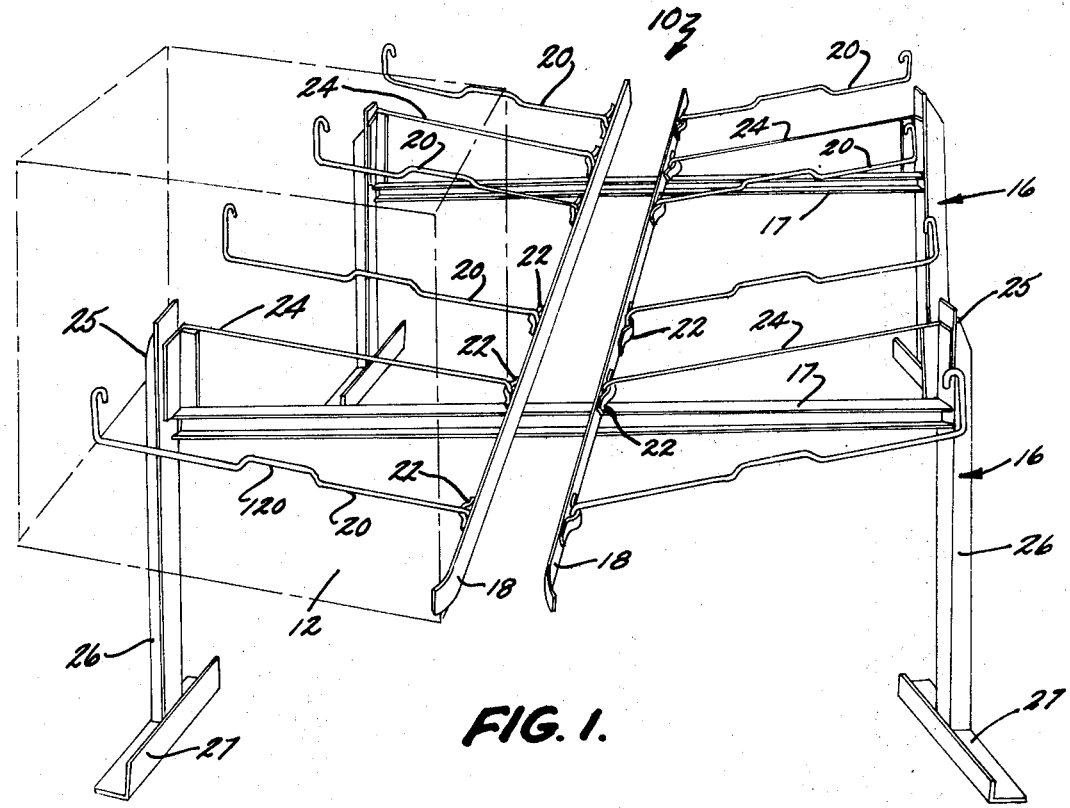
FIG. 1 is an overhead perspective view showing the support apparatus of the invention, with an exemplary poultry cage shown in phantom.

In FIG. 1, the complete structure of the present cage mounting and supporting apparatus 10 is illustrated, where the same is shown supporting a typical poultry cage construction, a single segment or unit 12 thereof being shown in phantom. The apparatus 10 includes two basic components or parts; these are a supportive mounting means which includes a plurality of spaced-apart support standards 16, and a number of individual beam support members 20 which are held in an elevated position by the support standards 16 and other portions of the aforementioned supportive mounting means to be set forth subsequently. As illustrated, the standards 16 are generally H-shaped structures made of rigid material such as angle stock or the like and having spaced vertical uprights or legs 26 with feet 27 at the lower extremity thereof, with a cross-bar 17 interconnecting the spaced legs 26.

The supportive mounting means noted above includes, in addition to the support standard 16 already described, a pair of elongated plate-like members 18 which interconnect the support standards 16 and extend transversely thereof, across the middle of the cross-bar portion 17 of each such standard. Interconnecting members 18 define the side edges of a central channel in the complete cage assembly, in which channel the egg-collection conveyor belt mentioned previously is located. Interconnecting members 18 also serve to anchor one end of each of the beam support members 20 noted previously, preferably in the manner illustrated in FIG. 2. That is, a number of generally U-shaped mounting collars 22 are secured to each of the interconnecting members 18 at an appropriate place to properly locate each beam support. The collars 22 each define a vertically-oriented, generally cylindrical passage or pocket between themselves and the members 18, and the end of each beam member 20 which is located closest to a given interconnecting member 18, has a downwardly-angled or offset end extremity which is slidably received in such passage or pocket, thereby attaching the beam support to the particular interconnecting member 18 involved.

In a like manner, the interconnecting members 18 also support a plurality of spaced structural support members 24 which form a part of the supportive mounting means mentioned above. Supports 24 are inclined with respect to the horizontal at the same angle which is desired for the floor of the poultry cage, and the end extremity of each support member 24 located opposite the interconnecting members 18 is attached to the upper end extremity 25 of the vertical leg portion 26 of each support standard 16. The structural supports 24 are located and spaced so as to lie directly beneath a sidewall of each individual cage segment or unit 12 which the mounting apparatus 10 is to support; as will be understood, normally a pair of elongated cage row constructions which each define a large number of mutually segregated but laterally adjacent cage segments 12 will be mounted in a mutually spaced and oppositely-disposed manner on the mounting apparatus 10, each such elongated cage construction located generally over one of the two sets of beam support members 20 and structural supports 24 positioned above one or the other lateral half of the various standards 16. In this configuration, each individual cage segment will be located immediately adjacent another, with a partition or the like located therebetween to form the sidewall of each such cage segment. As stated, the structural support members 24 are to be located directly beneath each such partition or cage segment sidewall.

Figure 2:
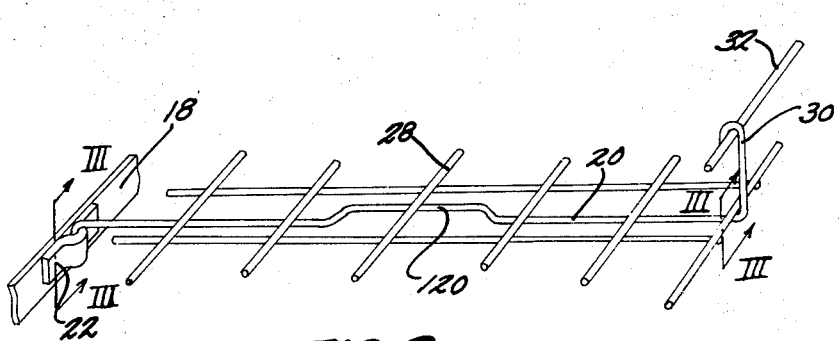
FIG. 2 is an enlarged, fragmentary perspective view showing the support beam of the invention in greater detail.
Figure 3:
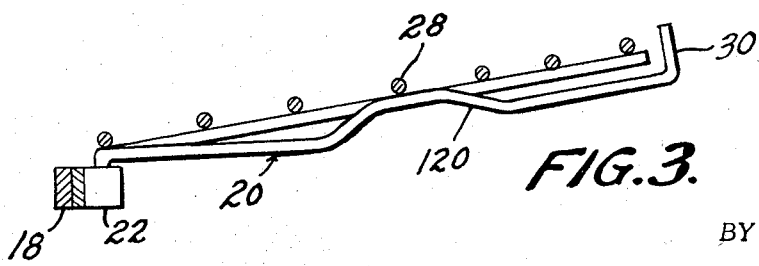
FIG. 3 is a fragmentary sectional view taken along the line III—III of FIG. 2.

In accordance with the foregoing, it will be apparent that the floor portion of each cage segment has only a single beam support member 20 extending beneath its central extremities. Moreover, it will be noted that each of the various beam support members 20 has a raised segment 120 located centrally thereof; in the preferred embodiment illustrated, this is an integral vertically offset portion of the beam member itself. It is this raised or offset portion, and only this portion of the beam support members 20 which contacts the poultry-supporting portion of the floor of the various cage segments. That is, as illustrated in FIG. 2, the medial or centrally-located raised floor-engaging portion 120 lies in contact with a single one of the rods or strands 28 of which the mesh floor of the cage is constructed, rather than being in contact with each of the strands or rods located directly above the entire length of the beam member 20. Stated differently, if a single unit of the mesh floor be defined as one of the rectangular shapes formed by four mutually intersecting strands, then the beam support member 20 extending beneath the floor of each cage segment contacts only a single such mesh unit, rather than a plurality of the same arranged in a straight-line sequence.

At its outer end extremity, opposite that fitted into one of the collars 22 and thus attached to one or the other of the elongated interconnecting members 18, each of the beam support members 20 extends upwardly to form a hook-like offset extremity 30. This serves as an attachment portion, by which the beam support members engage the rear side of the respective cage segments. This is illustrated in FIG. 2, where such rear cage side is represented by the lowermost rod or stringer 32 thereof which, with other like elements, forms the open-mesh rear side of the cage. As illustrated, the hook-like attachment portion 30 of beam member 20 extends above the plane in which the majority of this straight linear beam member is located, but by an amount which is sufficient to allow hook 30 to extend over rod 32 only when the floor-engagement portion 120 of beam member 20 is tightly in contact with the underside of rod or stringer 28 in the cage floor. Consequently, the attachment portion 30 serves to maintain the upraised segment 120 of the beam member 20 in firm and continuous contact with the floor of each individual cage segment or unit at all times, thereby holding the cage rows securely in place upon their supporting members disposed immediately therebeneath. This provides the required degree of support and bracing for the floor of the cages without, however, making the floor unduly rigid and, at the same time, it makes an integrated or unit-acting assembly of the cages and the various beam support members.

It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure as utilize the concepts of the invention and clearly incorporate the spirit thereof are to be considered as within the scope of the claims appended herebelow, unless these claims by their language specifically state otherwise.

We claim:
1. Mounting apparatus for supporting poultry confinement cages of the type having open-mesh floors in an elevated position, comprising: a beam support member disposed beneath the floor of each such cage; supportive mounting means for holding said beam member in an elevated position; said beam member extending under a substantial portion of such floor and being spaced therebeneath over most of said portion; and said beam member having a cage-floor engagement portion of a size and shape to engage only a single mesh unit of such floor; said beam member vertically supporting said floor at its said mesh unit, in a manner providing minimum inhibition to the natural flexibility of such floor.

2. The mounting apparatus for poultry cages recited in claim 1, wherein said cage-floor engagement portion of said beam is of a size and shape to engage only a single strand of said mesh floor.

3. The apparatus of claim 2, wherein said single strand is located generally centrally of said cage floor.

4. The apparatus of claim 2, wherein said beam is a generally linear member and said cage-floor engagement portion of said beam comprises a vertically raised segment of such member.

5. The apparatus of claim 4, wherein said vertically raised segment of said beam member comprises an offset integral part thereof.

6. The apparatus of claim 3, wherein said beam member extends substantially completely across the underside of said cage floor, and wherein said cage-floor engagement portion of said beam is located medially thereof.

7. The apparatus of claim 6, wherein said engagement portion comprises an upwardly offset integral part of said beam member.

8. The apparatus of claim 7, wherein said beam member has an attachment portion at at least one end thereof for engaging a side of such cage.

9. The apparatus of claim 8, wherein said attachment portion comprises a hook-like offset.

10. The apparatus of claim 9, wherein said hook-like offset is oriented downwardly and arranged to effectively pull such cage downwardly to maintain said single strand in contact with said engagement portion of said beam member.

11. The apparatus of claim 3, wherein said supportive mounting means comprises upright standard elements, said elements having portions arranged to restingly support such cage by engaging the same only at its edges, and said beam member being the only supporting structure in contact with the central area of said cage floor.

12. The apparatus of claim 11, wherein said standard elements have portions which interengage with an end extremity of said beam members to thereby hold the latter in an elevated position.

13. The apparatus of claim 12, wherein said beam member extends substantially completely across the underside of said cage floor, and wherein said cage-floor engagement portion of said beam is located medially thereof.

14. The apparatus of claim 13, wherein said beam member has an attachment portion at its other end extremity opposite said one end extremity thereof, said attachment portion arranged to engage a side of said cage.

15. The apparatus of claim 14, wherein said attachment portion comprises a hook-like offset.

16. The apparatus of claim 15, wherein said hook-like offset is oriented downwardly and arranged to effectively pull such cage downwardly to maintain said single strand in contact with said engagement portion of said beam member.

17. The apparatus of claim 16, wherein said engagement portion comprises an upwardly offset integral part of said beam member.

References Cited

UNITED STATES PATENTS 3,241,523   3/1966   Kurtz et al. _____ 119—48

HUGH R. CHAMBLEE, Primary Examiner

U.S. Cl. X.R.

119—48